(12) United States Patent
Kawai

(10) Patent No.: US 9,484,567 B2
(45) Date of Patent: Nov. 1, 2016

(54) BATTERY PACK

(71) Applicant: Panasonic Intellectual Property Management Co., Ltd., Osaka (JP)

(72) Inventor: Akira Kawai, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 2 days.

(21) Appl. No.: 14/633,303

(22) Filed: Feb. 27, 2015

(65) Prior Publication Data

US 2016/0056442 A1 Feb. 25, 2016

(30) Foreign Application Priority Data

Aug. 22, 2014 (JP) .................. 2014-169599

(51) Int. Cl.
| | |
|---|---|
| *H01M 2/34* | (2006.01) |
| *H01M 2/20* | (2006.01) |
| *H01H 35/42* | (2006.01) |
| *H01M 10/42* | (2006.01) |
| *H01M 10/48* | (2006.01) |

(52) U.S. Cl.
CPC ............. *H01M 2/34* (2013.01); *H01H 35/42* (2013.01); *H01M 2/204* (2013.01); *H01M 10/425* (2013.01); *H01M 10/482* (2013.01); *H01M 2200/00* (2013.01); *H01M 2220/30* (2013.01)

(58) Field of Classification Search
CPC .... H01M 2/204; H01M 2/34; H01M 10/425; H01M 35/42; H01M 2200/00
See application file for complete search history.

(56) References Cited

U.S. PATENT DOCUMENTS

2009/0159347 A1* 6/2009 Zhou .................. H01M 2/206
180/65.1
2012/0045667 A1 2/2012 Yoneda et al.
2015/0349314 A1 12/2015 Yasui et al.

FOREIGN PATENT DOCUMENTS

| JP | 2008-041507 A | 2/2008 |
| JP | 2012-043684 A | 3/2012 |
| WO | WO 2014/109284 A1 | 7/2014 |

OTHER PUBLICATIONS

Extended European Search Report dated Dec. 23, 2015 for corresponding European Application No. 15157362.3.

* cited by examiner

*Primary Examiner* — Cynthia H. Kelly
*Assistant Examiner* — Monique Wills
(74) *Attorney, Agent, or Firm* — Renner, Otto, Boisselle & Sklar, LLP

(57) ABSTRACT

A battery pack includes battery cells, at least one terminal having a shape that enables connection with another device, and electric connectors located between at least two of the battery cells and between one of the battery cells and the at least one terminal. At least one of the electric connectors breaks a current path when contacting water.

7 Claims, 2 Drawing Sheets

BATTERY PACK

CROSS-REFERENCE TO RELATED APPLICATIONS

This application is based upon and claims the benefit of priority from prior Japanese Patent Application No. 2014-169599, filed on Aug. 22, 2014, the entire contents of which are incorporated herein by reference.

FIELD

The present disclosure relates to a battery pack, and more particularly, to a rechargeable battery pack.

BACKGROUND

Japanese Laid-Open Patent Publication No. 2012-43684 discloses a battery pack that is used as a power supply for a portable device such as a cordless power tool. The battery pack includes an assembled battery in which batteries are connected in series.

SUMMARY

A power tool using a battery pack may be used outdoors or in a humid environment. The contact of water (moisture) with the battery cells in the battery pack may cause over-discharging or electrolyte leakage.

It is an object of the present disclosure to provide a battery pack that improves safety.

One aspect of the present disclosure is a battery pack that includes battery cells, at least one terminal having a shape that enables connection with another device, and electric connectors located between at least two of the battery cells and between one of the battery cells and the at least one terminal. At least one of the electric connectors breaks a current path when contacting water.

Other aspects and advantages of the present disclosure will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

Figure 1:
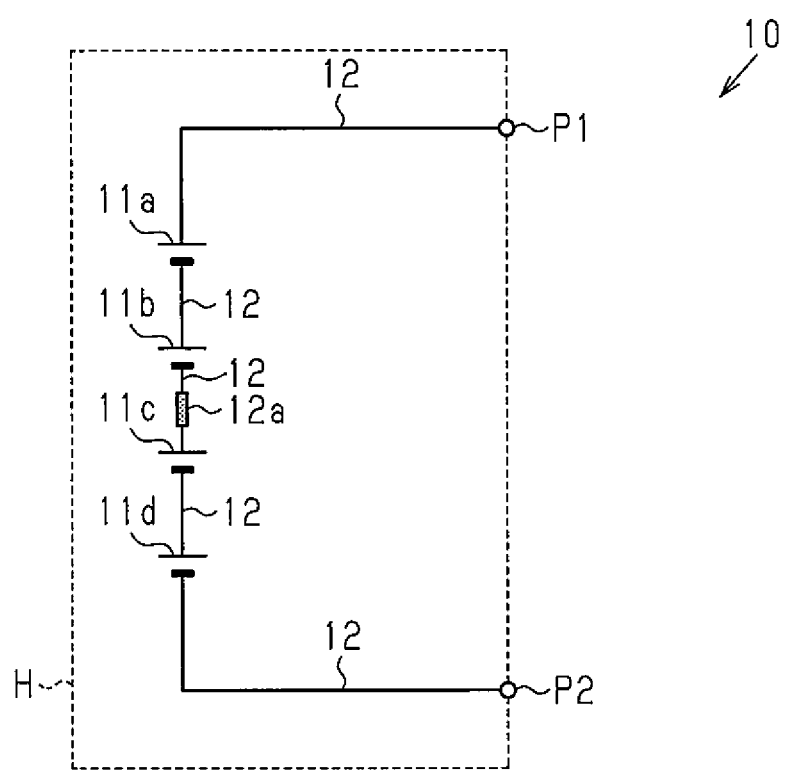
FIG. 1 is a schematic circuit diagram of a battery pack according to one embodiment.

One embodiment of a battery pack will now be described. As shown in FIG. 1, the battery pack 10 includes battery cells 11a to 11d that are accommodated in a housing H. The battery cells 11a to 11d are rechargeable batteries such as lithium ion batteries, nickel metal hydride batteries, or nickel cadmium batteries.

The battery pack 10 includes power terminals, namely, a positive terminal P1 and a negative terminal P2.

Communication plates 12, which are conductive metal plates, are arranged between the battery cells 11a to 11d, between the battery cell 11a and the positive terminal P1, and between the battery cell 11d and the negative terminal P2. The communication plates 12 provide electrical connection between the battery cells 11a to 11d, between the battery cell 11a and the positive terminal P1, and between the battery cell 11d and the negative terminal P2. In the example of FIG. 1, the communication plates 12, the positive terminal P1, the battery cells 11a to 11d, and the negative terminal P2 form a series-current path.

Figure 2:
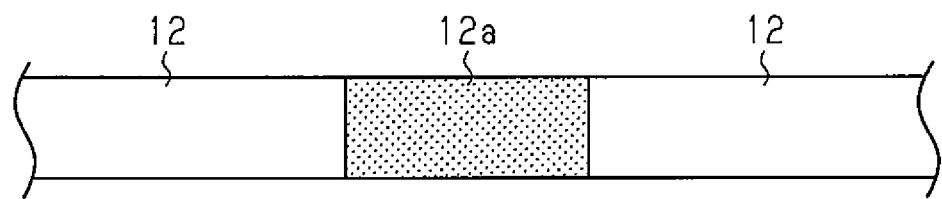
FIG. 2 is a schematic diagram showing a circuit breaker in the battery pack of FIG. 1.

Referring to FIGS. 1 and 2, one of the communication plates 12 (e.g., the communication plate 12 between the battery cell 11b and the battery cell 11c) includes a solder joint 12a. The solder joint 12a is formed from a metal that is easily dissolved by water (e.g., tin).

When the power terminals P1 and P2 of the battery pack 10 are connected to the terminals of a power tool, the battery pack 10 supplies the power tool with power. When the power terminals P1 and P2 of the battery pack 10 are connected to the terminals or a charger, the battery pack 10 is charged by the charger.

The operation of the battery pack 10 in the present embodiment will now be described.

The solder joint 12a connects at least two of the battery cells 11a to 11d (e.g., battery cell 11b and battery cell 11c) in the battery pack 10. For example, when water enters the housing H, the water reacts with and dissolves the solder joint 12a. This breaks, or interrupts, the current path.

The present embodiment has the advantages described below.

(1) At least one of the communication plates 12 is configured to break, or interrupt, the current path when contacting water. The at least one communication plate 12 breaks the current path when reacting with water that enters the housing H. This obviates or reduces over-discharging of the battery cells 11a to 11d and improves the safety of the battery pack 10.

(2) One or more of the communication plates 12 is formed by a metal that reacts with water. When water enters the housing H, the metal ensures that the current path is broken, or interrupted. This further improves the safety of the battery pack 10.

(3) One or more of the communication plates 12 includes the solder joint 12a, which is dissolved by water that enters the housing H. This further improves the safety of the battery pack 10.

It should be apparent to those skilled in the art that the present invention may be embodied in many other specific forms without departing from the scope of the invention. Particularly, it should be understood that the present invention may be embodied in the following forms.

Figure 3:
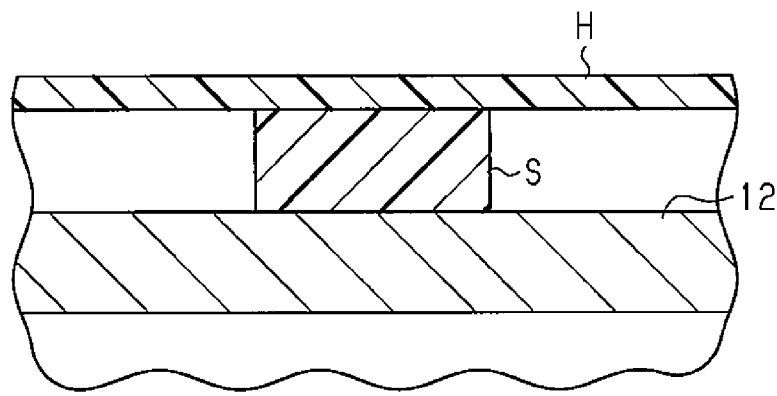
FIG. 3 is a partial cross-sectional view showing a further example of a battery pack.

FIG. 3 shows an example in which a water retention member S, which easily accumulates water, is arranged in the housing H in direct contact with a communication plate 12 (preferably, the solder joint 12a). The water retention member S is, for example, a sponge block. The water retention member S absorbs water or moisture that enters the housing H. Further, the water retention member S actively or collectively supplies the absorbed water to the portion that is to break the current path (preferably, the solder joint 12a). This allows the water retention member S to readily break the current path when water enters the battery pack 10.

Figure 4:
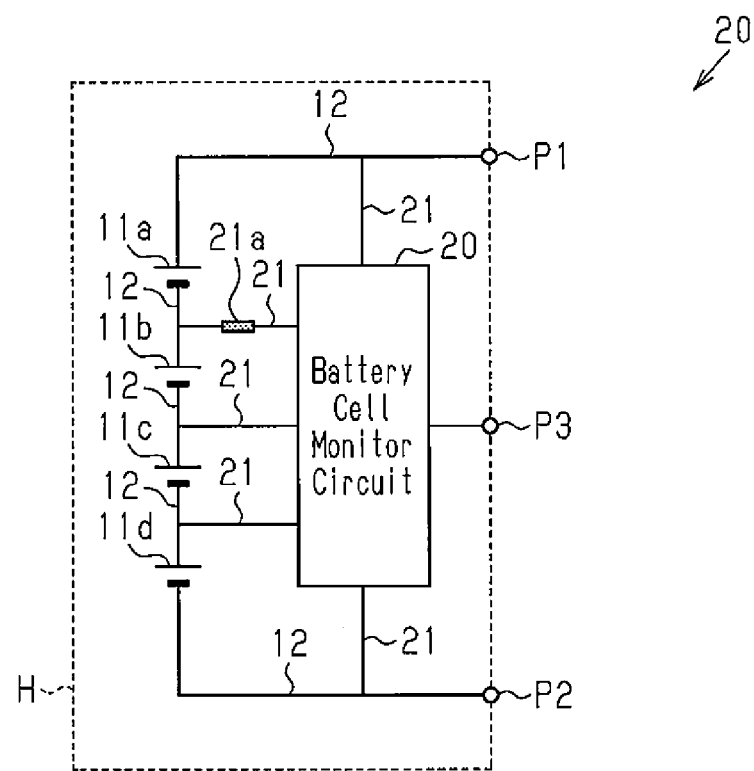
FIG. 4 is a schematic circuit diagram showing another example of a battery pack.

FIG. 4 shows an example in which the battery pack 10 may include a battery cell monitor circuit 20 that monitors the conditions of the battery cells 11a to 11d. For example, one or more communication plates 21 electrically connect the battery cell monitor circuit 20 to one or more of the communication plates 12. In the illustrated example, the battery cell monitor circuit 20 is electrically connected to each of the battery cells 11a to 11d. The battery cell monitor circuit 20 may be a voltage monitor circuit that monitors the output voltage of each of the battery cells 11a to 11d. The battery cell monitor circuit 20 outputs a condition signal, which corresponds to the condition (e.g., output voltage) of each of the battery cells 11a to 11d, from a signal terminal P3 of the battery pack 10. The cell condition signal is provided to, for example, a control unit of the charger or a control unit of the power tool. The control unit of the charger or power tool is able to acknowledge the state of charge from the cell condition signal.

One or more of the communication plates 21 may include a solder joint 21a. When reacting with water, the solder joint 21a breaks and interrupts the corresponding communication plate 21. In this case, the battery cell monitor circuit 20 acknowledges the occurrence of an anomaly and outputs an anomaly signal from the signal terminal P3. For example, based on the anomaly signal, the control unit of the power tool may suspend the supply of power to the power tool from the battery pack 10. Further, for example, based on the anomaly signal, the control unit of the charger may suspend the charging of the battery pack 10.

In the current path including the series-connected battery cells 11a to 11d, the current path needs to be configured to enable the flow of a large amount of current when charging or discharging is performed. In contrast, the communication plates 21, which connect the battery cells 11a to 11d and the battery cell monitor circuit 20, are conductive members that need only a small amount of current to perform condition detection. Thus, the communication plates 21 are narrower than the communication plates 12. The relatively narrow communication plates 21 (solder joint 21a) is dissolved more quickly than the communication plates 12 (solder joint 12a). This improves the response to the entrance of water.

The number of the battery cells 11a to 11d is four. However, there may be any number of battery cells.

The metal that easily dissolves in water is not limited to solder.

The present disclosure includes the embodiments described below.

Embodiment 1

A battery pack (10) including battery cells (11a to 11d), at least one terminal (P1 and/or P2) having a shape that enables connection with another device, and electric connectors (12, 21) located between at least two of the battery cells (11a to 11d) and between one of the battery cells (11a to 11d) and the at least one terminal (P1 and/or P2). At least one of the electric connectors (12a, 21a) breaks a current path when contacting water.

Embodiment 2

The battery pack further includes a battery cell monitor (20) that monitors conditions of the battery cells (11a to 11d). The at least one of the electric connectors (21a) is located between the battery cell monitor (20) and the battery cells (11a to 11d).

Embodiment 3

The at least one of the electric connectors (12a, 21a) is a metal member that reacts with water.

Embodiment 4

The at least one of the electric connectors (12a, 21a) includes a solder joint.

Embodiment 5

The battery pack further includes a water retention member (S) that directly contacts the at least one of the electric connectors (12a, 21a), wherein the water retention member easily accumulates water.

Embodiment 6

The at least one of the electric connectors (21a) is power terminals.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above description, various features may be grouped together to streamline the disclosure. This should not be interpreted as intending that an unclaimed disclosed feature is essential to any claim. Rather, inventive subject matter may lie in less than all features of a particular disclosed embodiment. The scope of the invention should be determined with reference to the appended claims, along with the full scope of equivalents to which such claims are entitled.

The invention claimed is:

1. A battery pack comprising:
   battery cells;
   at least one terminal having a shape that enables connection with another device; and
   electric connectors located between at least two of the battery cells and between one of the battery cells and the at least one terminal,
   wherein at least one of the electric connectors breaks a current path when contacting water,
   the battery pack further comprising a water retention member that directly contacts the at least one of the electric connectors, wherein the water retention member easily accumulates water.

2. The battery pack according to claim 1, further comprising a battery cell monitor that monitors conditions of the battery cells, wherein the at least one of the electric connectors is located between the battery cell monitor and the battery cells.

3. The battery pack according to claim 1, wherein the at least one of the electric connectors is a metal member that reacts with water.

4. The battery pack according to claim 1, wherein the at least one of the electric connectors includes a solder joint.

5. The battery pack according to claim 1, wherein the at least one terminal is power terminals.

6. The battery pack according to claim 1, wherein the water retention member is a sponge block.

7. The battery pack according to claim 1, wherein the water retention member is configured to actively or collectively supply the absorbed water to a solder joint included in the at least one of the electric connectors.

* * * * *